Sept. 2, 1969
D. G. STETKA
3,464,250
CORRUGATING APPARATUS
Filed March 2, 1965
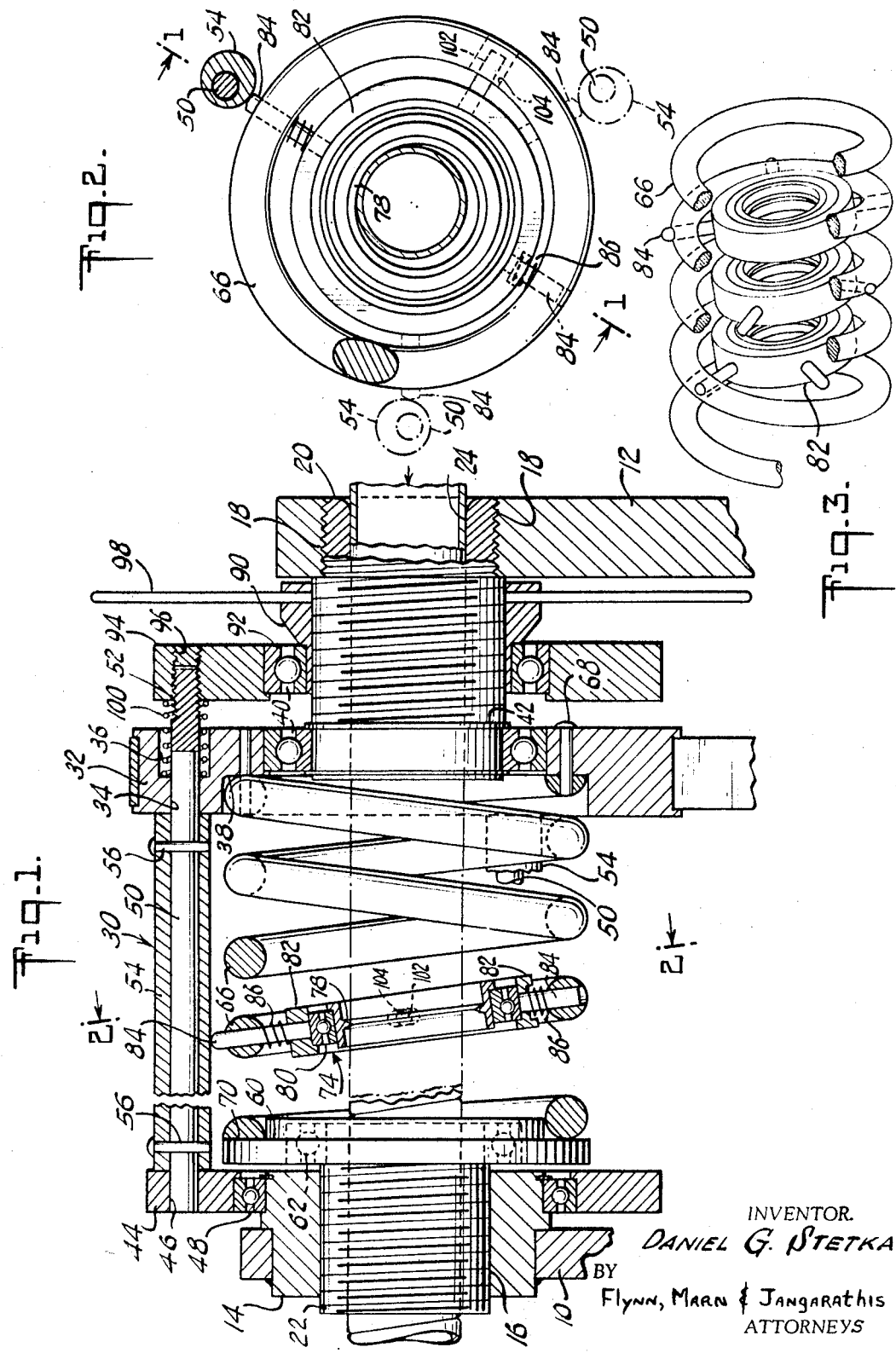
INVENTOR.
DANIEL G. STETKA
BY
Flynn, Marn & Jangarathis
ATTORNEYS United States Patent Office 3,464,250
Patented Sept. 2, 1969

3,464,250
CORRUGATING APPARATUS
Daniel George Stetka, Hopewell Township, Mercer County, N.J., assignor to Western Electric Company, Incorporated, New York, N.Y., a corporation of New York
Filed Mar. 2, 1965, Ser. No. 436,597
Int. Cl. B21b 13/20, 19/12
U.S. Cl. 72—77    12 Claims

ABSTRACT OF THE DISCLOSURE

This disclosure is directed to apparatus for corrugating cylindrical tubes. Die elements for providing the corrugations are mounted on separate convolutions of a relatively stiff helical spring and are adjustable individually toward or away from the axis of the spring, which is substantially concentric with the axis of the cable sheath. The spring is mounted so that it can be compressed or extended to change the pitch and helix angles of the corrugations produced by the die means. All adjustments to the die position and angles can be made during corrugation, i.e., without interrupting the operation of the corrugating apparatus or, other equipment operating in association therewith.

BACKGROUND OF THE INVENTION

In a manner well known to the prior art, cables have been provided with corrugated metal sheaths of high mechanical strength; aluminum, copper and steel being the metals most commonly used. Typically, a cable sheath is formed from a strip of metal which passes through successive forming dies which shape the metal strip into cylindrical or tubular forms about the cable, the opposed longitudinal edges of the sheath then being welded or soldered together. Corrugations are then formed in the metal sheath by passing the sheath longitudinally through rotating, annular dies which surround the sheath and which are positioned eccentrically of the longitudinal axis of the sheath. The dies engage and bend successive portions of the advancing cable sheath inwardly to produce the desired spiral or helical corrugations in the sheath.

Depending upon the amount of mechanical strength, rigidity or flexibility desired to be present in such a cable sheath, the depth and helical angle of corrugation is varied accordingly. And, since such corrugating apparatus is ordinarily utilized in a continuous cable manufacturing line operation by being employed in tandem with the apparatus and dies for forming the tubular sheath from a metal strip, welding or soldering apparatus for seaming the longitudinal edges of the metal strip, etc.; it is highly desirable and advantageous to be able to vary the helical angle and depth of corrugations while the corrugating operation is taking place, or in a broader and more significant sense, without having to stop the corrugating apparatus and hence shut down the entire cable manufacturing operation. The prior art corrugating apparatus employing rotatable, eccentrically mounted dies has been of such construction so as to require the apparatus to be stopped in order to vary the depth and helical angle of corrugation.

Accordingly, it is an object of the present invention to provide new and improved corrugating apparatus which may be employed to vary, while the corrugating operation is taking place, the helical angle and depth of the corrugation being produced.

A further object of the present invention is to provide new and improved corrugating apparatus for utilization in a continuous cable line manufacturing operation whereby the helical angle and depth of the corrugations being produced may be varied without having to stop or shut down the entire cable manufacturing operation.

A feature of the present apparatus embodying one aspect of the present invention includes means for varying the helical angle of corrugation produced by such apparatus, while such corrugation is taking place, and more specifically, expansible and compressible means for supporting and varying the helical angle of inclination of rotatable, eccentrically mounted annular dies while such dies are producing corrugations in a cylindrical tube advancing through the dies.

Another feature of the apparatus of the present invention includes means for varying the depth of corrugation produced by such apparatus while such corrugation is taking place, and more specifically, oscillatable eccentric means for varying, while the corrugation is taking place, the depth of engagement of the aforementioned dies with a cylindrical tube as it is advancing through the dies.

An even more complete understanding of the present invention may be had by considering the following detail description in conjunction with the drawings, wherein:

FIGURE 1 is a partial sectional view, taken substantially along the line 1—1 in FIGURE 2, and showing corrugating apparatus constructed in accordance with the present invention;

FIGURE 2 is a view, taken substantially along the line 2—2 in FIGURE 1, showing various radial relationships of some of the structure shown in FIGURE 1; and FIGURE 3 is a diagrammatic view used in explaining the manner in which a plurality of annular corrugating dies are supported by a coil spring.

Referring now to FIGURE 1, there are shown, in section, two vertical, stationary supports 10 and 12 which are secured to, and supported by, a suitable base, not shown. Secured fixedly to support 10, such as by welding, is a block member 14 which is provided with internal threads for receiving, in threaded engagement, an externally threaded annular collar or bushing 16. Support 12 is provided with internal threads at 18 for receiving, in threaded engagement, a second annular collar or bushing 20. Collars or bushings 16 and 20 are provided with apertures 22 and 24, respectively, which are aligned coaxially with respect to each other, and which serve as guides or supports for the cable sheath to be corrugated; the sheath being passed through the apertures from right to left as viewed in FIGURE 1.

A rotatable corrugating die carriage, represented generally by the numerical designation 30 in FIGURE 1, includes a rotatable annular drive pulley 32, shown in section, having formed therein a plurality of horizontal apertures 34 and counter bores 36 (only one of each being shown), and a larger counterbore 38. The inner surface of the pulley 32 is in pressed frictional engagement with the outer race of a bearing 40; the inner race of the bearing being in pressed frictional engagement with a stationary annular collar 42 which is, in turn, in pressed frictional engagement with stationary collar or bushing 24. Carriage 30 further includes another rotatable annular member 44, also shown in section, which is provided with a plurality of horizontal apertures 46 and the inner surface of which is in pressed frictional engagement with the outer race of a bearing 48; the inner race of the bearing being in pressed frictional engagement with stationary block member 14. The apertures 34 and 46, formed in drive pulley 32 and annular member 44, respectively, are aligned and extending therethrough is a plurality of rotatable rods 50 which are provided with long lead threads 52; the rods being rotatable with the carriage 30 and also rotatable about their own axes. Surrounding each rotatable rod 50 is an eccentrically shaped tubular member 54 which is pinned to its associated rod by pins 56 for eccentric rotation about the axis of its associated rod, better seen in FIGURE 2.

Only one rod 50 and tubular member 54 are shown in FIGURE 1 for the sake of clarity; however, three are indicated in FIGURE 2 as being included in the present embodiment. Also included in the rotatable die carriage 30 is another rotatable annular flange-like member 60, the inner horizontal surface of which is in pressed frictional engagement with the outer race of bearing 62; the inner race of the bearing being in pressed frictional engagement with the outer surface of one end of the stationary collar or bushing 16.

A relatively stiff coil spring 66, being in compression, is mounted for rotation, with the die carriage 30, coaxially of the stationary collars or bushings 16 and 20. One end of the coil spring 66 resides within the counterbore 38, formed within the rotatable drive pulley 32, and is secured to the drive pulley for rotation therewith by pin 68 extending through aligned apertures formed in the coil spring and the drive pulley. The other end of the coil spring is in pressed frictional engagement with an inner vertical bearing surface 70 of the rotatable annular flange-like member 60, for rotation therewith.

A plurality of annular corrugating dies 74, as shown diagrammatically in FIGURE 3 (only one being shown in FIGURE 1 for the sake of clarity), are mounted adjustably within the interior of the coil spring 66 for movement toward and away from the axis of the spring. The annular corrugating dies are provided with relatively sharp corrugating surfaces 78, better seen in FIGURE 2, which are suitably secured, such as by welding or by complementary shoulders and recesses as shown, to the inner races of the bearing 80. The outer races of the bearings, similarly, are suitably secured to annular collars 82, each collar having a pair of diametrically opposed radial apertures formed therein into which a pair of pins 84 is resiliently secured. The two pins projecting from each collar extend into diametrically opposed apertures drilled into a convolution of the coil spring 66. Coiled compression springs 86 encircle loosely the pins 84 and each spring urges its associated die 74 substantially radially inwardly by pressing against the associated convolution of the spring 66 and into engagement with the associated collar 82. As is evident from FIGS. 1 and 2, one of the pins 84 associated with each spring convolution extends through and beyond the aperture in spring 66 so as to abut and operationally cooperate with an associated eccentric tubular member 54. Each die 74 is maintained in substantial coplanar alignment with the convolution of the spring in which the die resides by being provided with an additional pin 102, which pin resides within an oversized, generally elliptically shaped aperture 104 formed in the convolution of the spring. Pin 102, in cooperation with aperture 104, maintains the annular die in substantial coplanar alignment with the convolution of the spring yet permits the die to move, limitedly, toward and away from the axis of the spring.

In the present embodiment of the invention, three annular corrugating dies are employed and as described above and shown in FIGURE 2, the dies are displaced radially, with respect to each other, one hundred and twenty degrees (120°) so as to equalize the forces applied to the sheath. It will be understood that various other numbers of dies, also displaced radially an equal distance, could be used.

Referring again to the stationary annular collar or bushing 20, the collar or bushing is provided with external threads, as shown in FIGURE 1, which engage threads formed internally of a rotatable nut or collar 90. The collar 90 receives, and is in pressed frictional engagement with, the inner race of a bearing 92 and the outer race of the bearing is in pressed frictional engagement with an annular linearly movable plate 94. Plate 94 is provided with a plurality of internally threaded apertures 96 which receive, in threaded engagement, the long lead threads 52 of the rotatable rods 50.

The internal threads formed in the apertures 96 of the plate 94 and the external long lead threads 52, formed on the end of the rods 50, cooperate to transform reciprocating linear movement of the plate 94, as the nut 90 is rotated clockwise or counterclockwise by rotation of wings or extensions 98, into eccentric motion of the tubular members 54 by rotating the tubes eccentrically and in unison about the axis of the rods 50. Compression springs 100, residing partially in the counterbores 36 and encircling the rods 50, engage the annular plate 94 and are provided to assure that the plate and bearing 92 remain in engagement with the rotatable nut 90 so as to follow the linear movement of the nut. The eccentric rotational motion or movement of the tubes 54 about their own longitudinal axes varies the radial positions of the pins 84 to vary, simultaneously, the radial positions of the annular corrugating dies 78. As the radial positions of the dies are varied, the dies are made more or less eccentric with respect to each other and, similarly, more or less eccentric with respect to the apertures 22 and 24 provided in collars or bushings 16 and 20, respectively, and, hence, more or less eccentric with respect to the longitudinal axis of the cable sheath to be passed through the collars and corrugated. Thus, by varying the degree or amount of eccentricity imparted to the corrugating dies, the depth of corrugation to be produced in a cable sheath is, accordingly, varied. It will be noted that the rotatable nut 90 is movable linearly of the stationary collar or bushing 20, independent of the passage of the cable sheath through the bushing, and also independent of the rotational movement of the die carriage 30, due to the bearing 92. Thus, it is understood that the depth of corrugation to be produced in the cable sheath can be varied while the corrugation is taking place.

The helical angle of the corrugations to be produced in the cable sheath can be varied by varying the angle of inclination of the annular corrugating dies 74 with the axis of the sheath. As clockwise and counterclockwise rotation is imparted alternately to the annular collar or bushing 16, by suitable means, the external threads provided thereon cooperate with the internal threads provided in the block member 14 to impart reciprocating linear movement to the collar and, hence, through the bearing 62, to the flange-like member 60. As the flange-like member is moved leftwardly, as viewed in FIGURE 1, the distance between the bearing surface 70 and the counterbore surface 38, of the drive pulley 32, is increased and the coil spring 66, being in compression, is permitted to be elongated or expanded. Expansion of the coil spring increases the angle of inclination of the convolutions of the spring and, since the annular corrugating dies 74 are supported, as described above, by the convolutions of the coil spring, the angle of inclination of the dies is accordingly increased. When the flange-like member 60 is moved to the right, as a result of rotation of the proper direction being imparted to the collar or bushing 16, the above-described distance is decreased and the coil spring 66 is compressed. Compression of the coil spring decreases the angle of inclination of the convolutions of the spring and, hence, the angle of inclination of the annular corrugating dies. As the angle of inclination of the dies is increased, the helical angle of corrugation to be produced in the cable sheath by the dies is correspondingly increased, and as the angle of inclination is decreased, the helical angle of corrugation is correspondingly decreased. It will be noted that the collar or bushing 16 can be moved linearly and axially of the cable sheath to be corrugated, independent of the passage of the cable sheath through the aperture 22. Also, the reciprocating linear motion can be imparted to the collar or bushing 16 while the carriage 30 is rotating since the collar or bushing 16 is movably linearly, internally of the stationary block 14 while the annular member 44 is simultaneously rotatable about the exterior of the stationary block due to bearing 48. Thus, the helical angle of corrugation to be produced in the cable sheath can be varied while the corrugating is taking place.

The drive pulley 32 may, if desired, be driven in unison with a tractor type capstan, not shown, which pulls the cable sheath through the corrugating apparatus to insure that the rotary motion of the corrugating dies, and the linear motion of the cable sheath, are synchronized.

It will be understood that the three annular corrugating dies of the shown embodiment of the present invention can be employed, depending upon the axial spacing of the dies and the speed of the cable sheath, to engage the cable sheath and to roll three parallel-spaced helical corrugations in the sheath, or in the alternative, and again depending upon the axial spacing of the dies and the speed of rotation of the dies relative to the linear speed of movement of the cable sheath, the dies can be of increasingly smaller diameter such that as they successively engage the cable sheath, they can be employed to roll successively, and increasingly deeper, corrugations in the sheath along the same helical path so as to gradually form a corrugation of greater depth than could be formed by a single die.

It will be understood that the above-described and shown embodiment is merely illustrative of the present invention, and that many modifications may be made without departing from the spirit and scope of the invention.

What is claimed is:

1. Apparatus for corrugating a cylindrical tube, which comprises:
    die means for producing helical corrugations in the cylindrical tube,
    means for varying the helical angle of the corrugations while the corrugating is taking place, and
    means, operable independently of said means for varying the helical angle, for varying the depth of the corrugations while the corrugating is taking place.

2. Apparatus for corrugating a cylindrical tube, which comprises:
    rotatable and eccentrically mounted annular die means for engaging and producing helical corrugations in the cylindrical tube,
    means for varying the angle of inclination of said die means to vary the helical angle of the corrugations produced and said means being operable while the corrugating is taking place, and
    additional means for varying the eccentricity of said die means to vary the depth of the corrugations produced and said additional means being operable while the corrugating is taking place.

3. Apparatus for corrugating a cylindrical tube, which comprises:
    a plurality of rotatable annular dies for engaging and imparting helical corrugations to the cylindrical tube,
    longitudinally deformable means for supporting the dies in spaced axial relationship,
    means for varying the length of the longitudinally deformable means to vary the helical angle of the corrugations while the corrugating is taking place, and
    eccentric means for engaging and displacing radially the dies to vary the depth of the corrugations while the corrugating is taking place.

4. In an apparatus for corrugating a cylindrical tube which apparatus includes a rotatable annular die for engaging and imparting helical corrugations to the tube,
    longitudinally deformable means for supporting the die in encircling relationship with the tube; and
    means, operable while the corrugating is taking place, for increasing and decreasing the length of the longitudinally deformable means to correspondingly increase and decrease the helical angle of corrugations imparted by the die.

5. In an apparatus for corrugating a cylindrical tube which apparatus includes a rotatable annular die encircling the tube eccentrically and for engaging the tube and imparting helical corrugations to the tube,
    eccentric means engageable with said die for increasing and decreasing the amount of eccentricity of the die with respect to the tube to correspondingly increase an decrease the depth of the corrugations imparted by the die, said eccentric means being operable to vary the amount of eccentricity of the die while the corrugating is taking place.

6. Apparatus for varying, while a corrugating operation is taking place, the helical angle and depth of the corrugations formed in a cylindrical tube, which comprises:
    a plurality of rotatable annular dies providing a plurality of apertures for receiving said tube;
    a rotatable coil spring having its axis substantially concentric with the axis of the tube and for supporting said dies at angles of inclination with respect to the tube, said dies being supported by said spring in axial displacement and so as to be adjustable eccentrically with respect to each other and the axis of the tube;
    rotatable means operable while the corrugating is taking place for extending and compressing the spring to vary the angle of inclination of the dies with respect to the axis of the tube; and
    a plurality of eccentrics mounted rotatably for imparting variable eccentricity to the dies such that the dies are made eccentric with respect to each other and the axis of the tube, said eccentrics being operable to vary the eccentricity imparted thereby while the corrugation is taking place.

7. Apparatus for varying, while a corrugating operation is taking place, the helical angle and depth of the corrugations formed in a cylindrical tube, which comprises:
    a plurality of rotatable annular dies which provide a plurality of apertures through which said tube may be moved longitudinally along its axis,
    a relatively stiff coil spring being in compression and for supporting said dies at angles of inclination with respect to the axis of said tube,
    a plurality of resiliently mounted pins associated with each die and for supporting the associated dies within separate convolutions of the spring such that the dies are substantially co-planar with the spring convolutions and movable individually toward and away from the axis of the tube,
    means for supporting said spring rotatably and substantially concentric of the axis of the tube,
    rotatable means operable while the corrugating is taking place for extending and compressing the spring to vary the angle of inclination of said dies with respect to the axis of the tube,
    a plurality of eccentrics for engaging individually one pin of each of said pairs of pins to move the dies toward and away from the axis of the tube, and
    means for supporting said eccentrics rotatably and radially of said spring and for varying the eccentricity of said eccentrics while the corrugating is taking place.

8. In an apparatus for corrugating a cylindrical tube which apparatus includes a plurality of rotatable annular dies encircling the tube eccentrically and for engaging the tube to produce helical corrugations therein as said tube is passed through said dies longitudinally along its axis,
    means for varying the helical angle of the corrugations while the corrugating is taking place including a relatively stiff coil spring being in compression and for supporting said dies in separate convolutions thereof and at angles of inclination with respect to the axis of said tube; and
    a pair of axially displaced rotatable members for constraining and supporting said spring rotatably and for varying the length of the spring while the corrugating is taking place to vary the angle of inclination of said dies with respect to the axis of the tube and, hence, vary the helical angle of the corrugations.

9. In an apparatus for corrugating a cylindrical tube which apparatus includes a plurality of rotatable axially displaced annular dies for engaging said tube and producing corrugations therein as said tube is passed longitudinally along its axis through said dies,
    means for varying the depth of the corrugations produced by said dies while said corrugating is taking place, including a plurality of eccentrics;
    a pair of axially displaced rotatable members for supporting said eccentrics rotatably and radially of said dies;
    a pair of resiliently mounted pins associated with each die, said eccentrics being engageable with one pin of each pair of said pins to move said dies toward and away from the axis of the tube and, hence, vary the depth of the corrugations produced by the dies; and
    a linearly and rotatably movable member for varying the eccentricity of said eccentrics while said corrugation is taking place.

10. Apparatus for corrugating a cylindrical tube which comprises:
    die means for producing helical corrugations in the cylindrical tube,
    means for varying the depth of the corrugations while the corrugating is taking place, and
    means, operable independently of said means for varying the depth of the corrugations, for varying the helical angle of the corrugations while corrugating is taking place.

11. In an apparatus for corrugating a cylindrical tube, which apparatus includes a die for engaging and imparting helical corrugations to the tube, the improvement comprising:
    means for varying the helical angle of the corrugations while the corrugating is taking place.

12. In an apparatus for corrugating a cylindrical tube, which apparatus includes an annular die for engaging and imparting helical corrugations to the tube, the improvement comprising:
    longitudinally deformable means for supporting the die in encircling relationship with the tube, and
    means for increasing and decreasing the length of the longitudinally deformable means to correspondingly increase and decrease the helical angle of corrugations imparted by the die.

References Cited

UNITED STATES PATENTS

| | | | |
|---|---|---|---|
| 432,232 | 7/1890 | Fife | 72—100 |
| 1,120,267 | 12/1914 | Brinkman | 72—77 |
| 2,023,417 | 12/1935 | Guarnaschelli | 72—77 |
| 2,385,498 | 9/1945 | Clifford | 72—100 |
| 3,269,005 | 8/1966 | Smith et al. | 72—77 |
| 3,323,339 | 6/1967 | Mattil | 72—77 |

FOREIGN PATENTS

| | | |
|---|---|---|
| 201,252 | 2/1956 | Australia. |
| 301,049 | 11/1954 | Switzerland. |
| 1,124,021 | 6/1956 | France. |

RICHARD J. HERBST, Primary Examiner

U.S. Cl. X.R.

72—98

UNITED STATES PATENT OFFICE
CERTIFICATE OF CORRECTION

Patent No. 3,464,250 September 2, 1969

Daniel George Stetka

It is certified that error appears in the above identified patent and that said Letters Patent are hereby corrected as shown below:

Column 7, line 35, beginning with "11. In an apparatus" cancel all to and including "taking place." in column 8, line 6. Column 8, line 7, "12." should read -- 11. --. In the heading to the printed specification, line 9, "12 Claims" should read -- 11 Claims --.

Signed and sealed this 2nd day of June 1970.

(SEAL)
Attest:

Edward M. Fletcher, Jr.  
Attesting Officer

WILLIAM E. SCHUYLER, JR.  
Commissioner of Patents